US009663056B2

(12) United States Patent
Sakurai et al.

(10) Patent No.: US 9,663,056 B2
(45) Date of Patent: May 30, 2017

(54) PILLAR GARNISH

(71) Applicant: TOYOTA JIDOSHA KABUSHIKI KAISHA, Toyota-shi, Aichi (JP)

(72) Inventors: Hideyuki Sakurai, Toyota (JP); Mitsuaki Asano, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/901,882

(22) PCT Filed: Jun. 18, 2014

(86) PCT No.: PCT/JP2014/066211
§ 371 (c)(1),
(2) Date: Dec. 29, 2015

(87) PCT Pub. No.: WO2015/008573
PCT Pub. Date: Jan. 22, 2015

(65) Prior Publication Data
US 2016/0368447 A1    Dec. 22, 2016

(30) Foreign Application Priority Data
Jul. 16, 2013   (JP) ................................. 2013-147863

(51) Int. Cl.
| B60R 21/213 | (2011.01) |
| B60R 13/02 | (2006.01) |
| B60R 21/215 | (2011.01) |
| B60R 21/232 | (2011.01) |

(52) U.S. Cl.
CPC .......... B60R 21/213 (2013.01); B60R 13/025 (2013.01); B60R 13/0206 (2013.01); B60R 21/215 (2013.01); B60R 21/232 (2013.01); *B60R 2021/21537* (2013.01)

(58) Field of Classification Search
CPC ... B60R 21/213; B60R 21/215; B60R 21/232; B60R 13/0206; B60R 13/025; B60R 2021/21537
See application file for complete search history.

(56) References Cited

U.S. PATENT DOCUMENTS 5,791,683 A * 8/1998 Shibata ................. B60R 21/201
280/730.1
6,102,435 A * 8/2000 Wallner ............. B60R 13/0212
280/728.2
(Continued)

FOREIGN PATENT DOCUMENTS

| JP | H09-109794 A | 4/1997 |
| JP | H09-240409 A | 9/1997 |

(Continued)

*Primary Examiner* — Drew J Brown
(74) *Attorney, Agent, or Firm* — Oliff PLC (57) ABSTRACT

An extension portion is formed at a vehicle front side end portion of a garnish main body. The extension portion bends back to the side thereof at which an storage space is formed, and projects toward a clip seat that is formed at the back side of the garnish main body. The extension portion is connected to a pillar inner panel and the clip seat by a clip. During expansion of a curtain airbag, the front pillar garnish turns about an integral hinge and the storage space opens up.

4 Claims, 6 Drawing Sheets

(56) References Cited

U.S. PATENT DOCUMENTS

| | | | | |
|---|---|---|---|---|
| 6,333,515 | B1* | 12/2001 | Kubota | B60R 13/0206 280/728.1 |
| 2005/0029780 | A1* | 2/2005 | Tanase | B60R 13/0225 280/730.2 |
| 2006/0261580 | A1* | 11/2006 | Tiesler | B60R 21/213 280/730.2 |
| 2007/0090634 | A1* | 4/2007 | Jang | B60R 21/213 280/730.2 |
| 2007/0108742 | A1* | 5/2007 | Itakura | B60R 21/213 280/728.3 |
| 2010/0109300 | A1 | 5/2010 | Inui et al. | |
| 2010/0199464 | A1* | 8/2010 | Sano | B60R 13/02 24/289 |
| 2011/0127754 | A1* | 6/2011 | Park | B60R 21/055 280/728.2 |
| 2016/0288760 | A1* | 10/2016 | Jinnai | B60R 21/213 |

FOREIGN PATENT DOCUMENTS

| | | |
|---|---|---|
| JP | 2002-211345 A | 7/2002 |
| JP | 2004-359044 A | 12/2004 |
| JP | 2008-230363 A | 10/2008 |
| JP | 2010-111220 A | 5/2010 |
| JP | 2011-111001 A | 6/2011 |
| JP | 2011-235723 A | 11/2011 |

* cited by examiner

PILLAR GARNISH

TECHNICAL FIELD

The present invention relates to a pillar garnish that accommodates a curtain airbag in a folded state between the pillar garnish and a body panel.

BACKGROUND ART

Heretofore, a curtain airbag device for a vehicle has been known (for example, see Patent References 1 and 2) that protects the head of a seated occupant at a time of a side collision, a time of a rollover or the like by inflating and expanding a curtain airbag along a side window from a vehicle width direction outer side end portion of a roof head lining.

In Patent Reference 1, plural penetrating holes are formed in a vertical wall portion of a clip seat that is formed integrally with a pillar garnish. When an airbag is being expanded, this vertical wall portion is ruptured. Hence, the expansion of the airbag is implemented smoothly. In Patent Reference 2, an arm portion is formed projecting from a clip that connects an inner panel with a pillar garnish at a clip seat, and a distal end of the arm portion is connected with the pillar garnish.

RELATED ART REFERENCES

Patent References

Patent Document 1: JP-A No. 2011-111001
Patent Document 2: JP-A No. 2008-230363

SUMMARY OF INVENTION

Technical Problem

However, according to the conventional technologies disclosed in Patent References 1 and 2, when the airbag is being expanded, the pillar garnish turns about the clip seat to open. Therefore, if the bag is increased in size in accordance with rollover protection specifications, expansion performance may be further improved if an expansion opening is made larger.

In consideration of the circumstances described above, an object of the present invention is to provide a pillar garnish that may make an expansion opening during expansion of a curtain airbag larger.

Solution to Problem

A pillar garnish relating to a first aspect of the present invention includes: a pillar garnish main body that forms, between the pillar garnish main body and a body panel, a storage space configured to store a curtain airbag in a folded state; an extension portion that is bent back and extends toward the storage space from an end portion of the pillar garnish main body at an opposite side of the pillar garnish main body from a curtain airbag expansion side end portion of the pillar garnish main body; a fastening portion that fastens the extension portion to the body panel; an attachment portion that is provided at a back side of the pillar garnish main body; and an engaging portion that disengageably engages the attachment portion with the body panel and attaches the attachment portion to the body panel.

The pillar garnish according to the first aspect includes the extension portion that is bent back to the storage space side from the end portion of the pillar garnish main body that is at the opposite side of the pillar garnish main body from the end portion at the curtain airbag expansion side. The extension portion is fastened to the body panel by the fastening portion. The attachment portion is formed at the back side of the pillar garnish main body. The attachment portion and the body panel are disengageably engaged by the engaging portion. Thus, the pillar garnish is attached to the body panel.

When the curtain airbag inflates and expands, the expansion side end portion of the pillar garnish is opened up and the engagement between the attachment portion and the body panel is disengaged by the expansion pressure of the curtain airbag. Hence, the pillar garnish turns about the end portion at the opposite side of the pillar garnish main body from the curtain airbag expansion side end portion while being connected with the body panel via the extension portion. Thus, an opening for expansion of the curtain airbag may be made larger.

In a pillar garnish relating to a second aspect of the present invention, the extension portion is fixed together with the attachment portion to the body panel by the fastening portion in a state in which the extension portion is nipped between the attachment portion and the body panel.

According to the pillar garnish relating to the second aspect, the extension portion is nipped between the attachment portion and the body panel and, in this state, the extension portion is fastened to the body panel together with the attachment portion. Therefore, compared to a case in which fixing of a extension portion and fixing of an attachment portion are respectively separately specified, structure may be simplified and a number of components may be reduced.

In a pillar garnish relating to a third aspect of the present invention, an integral hinge is formed at a back side of the end portion of the pillar garnish main body, which is at an opposite side from the curtain airbag expansion side end portion.

According to the pillar garnish relating to the third aspect, after the engagement between the attachment portion and the extension portion of the clip is disengaged, the pillar garnish turns about the integral hinge. Therefore, when the curtain airbag is expanding, the pillar garnish may be turned more smoothly and expansion performance may be improved.

In a pillar garnish relating to a fourth aspect of the present invention, the fastening portion and the engaging portion are formed integrally with the extension portion.

According to the pillar garnish relating to the fourth aspect, the fastening portion and the engaging portion are formed integrally with the extension portion and a number of components is not increased. Therefore, fabrication costs may be kept down.

In a pillar garnish relating to a fifth aspect of the present invention, an equipment retention portion for equipment that is disposed in the storage space is formed at the attachment portion.

According to the pillar garnish relating to the fifth aspect, equipment such as a drain hose or the like that is disposed in the storage space may be supported by the equipment retention portion. Therefore, a number of components may not be increased and fabrication costs may be kept down.

A pillar garnish relating to a sixth aspect of the present invention further includes: a retention portion that is formed at a location that corresponds with the curtain airbag expansion side end portion of the pillar garnish main body; and a shock-absorbing portion that projects from the extension portion toward the side thereof at which the retention portion is disposed, a distal end portion of the shock-absorbing portion being retained at the retention portion.

According to the pillar garnish relating to the sixth aspect, during, for example, a free motion headform impact, because the shock-absorbing portion absorbs the impact, impact absorption performance may be improved. Moreover, the shock-absorbing portion acts as a guide during the expansion of the curtain airbag and the curtain airbag may be expanded more consistently.

Advantageous Effects of Invention

As described above, the pillar garnish relating to the first aspect may, by turning about the end portion of the pillar garnish at the opposite side thereof from the curtain airbag expansion side end portion, make the opening during the expansion of the curtain airbag larger.

According to the pillar garnish relating to the second aspect, the structure of the pillar garnish may be simplified, in addition to which the number of components may be reduced.

According to the pillar garnish relating to the third aspect, because the integral hinge is formed, the pillar garnish may be more smoothly turned during the expansion of the curtain airbag. Thus, expansion performance may be improved.

According to the pillar garnish relating to the fourth aspect, because the fastening portion and the engaging portion are formed integrally with the extension portion, the number of components may be reduced and fabrication costs may be kept low.

According to the pillar garnish relating to the fifth aspect, because the equipment retention portion is formed at the attachment portion and retains equipment, the number of components may be reduced and fabrication costs may be kept low.

According to the pillar garnish relating to the sixth aspect, because the shock-absorbing portion is formed and absorbs an impact, impact absorption performance may be improved. Moreover, the shock-absorbing portion acts as a guide during the expansion of the curtain airbag and the curtain airbag may be expanded more consistently.

DESCRIPTION OF EMBODIMENTS

—First Exemplary Embodiment—

Herebelow, a first exemplary embodiment of the pillar garnish according to the present invention is described using FIG. 1 to FIG. 4. An arrow FR that is shown as appropriate in these drawings indicates a vehicle forward side, an arrow UP indicates a vehicle upward side, and an arrow IN indicates a vehicle width direction inner side.

Figure 1:
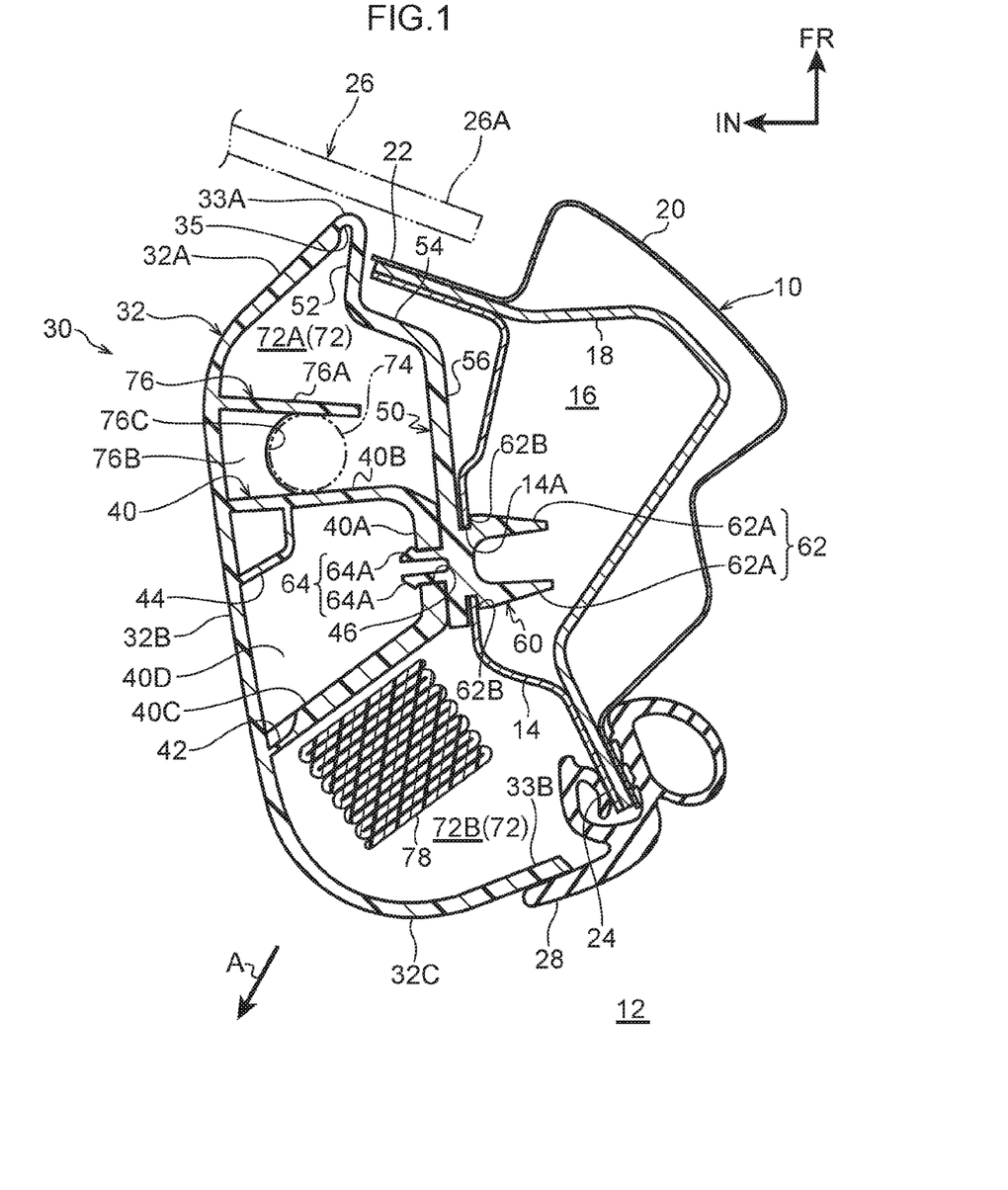
FIG. 1 is a plan sectional view of an assembled state of a pillar garnish in accordance with a first exemplary embodiment.

As shown in FIG. 1, a front pillar 10 is a vehicle body framework member fabricated of metal that is provided upright substantially along the vehicle up-and-down direction at a vehicle front-and-rear direction front edge portion of a door opening 12 that is formed in a vehicle body side portion. In structural terms, the front pillar 10 is structured by a pillar inner panel 14, a pillar reinforcement 18 and a pillar outer panel 20. The pillar inner panel 14 is disposed at the vehicle width direction inner side. The pillar reinforcement 18 is disposed at the vehicle width direction outer side of the pillar inner panel 14 and forms a closed cross section portion 16 between the pillar inner panel 14 and the pillar reinforcement 18. The pillar outer panel 20 is disposed at the vehicle width direction outer side of the pillar reinforcement 18 and structures an outer plate of the front pillar 10.

Respective front side flanges and rear side flanges of the pillar inner panel 14, pillar reinforcement 18 and pillar outer panel 20 are triply superposed with one another and, in this state, form a front side flange 22 and a rear side flange 24. In a plan sectional view, the front side flange 22 projects to the vehicle width direction inner side. An end portion 26A at the vehicle width direction outer side of a windshield glass 26 is attached, via an adhesive that is not shown in the drawings, to a vehicle front-and-rear direction front face side of the front side flange 22. In the plan sectional view, the rear side flange 24 projects substantially to the vehicle rear side. A door opening weatherstrip 28 constituted of a resilient material (rubber) is fitted to the rear side flange 24.

Figure 3:
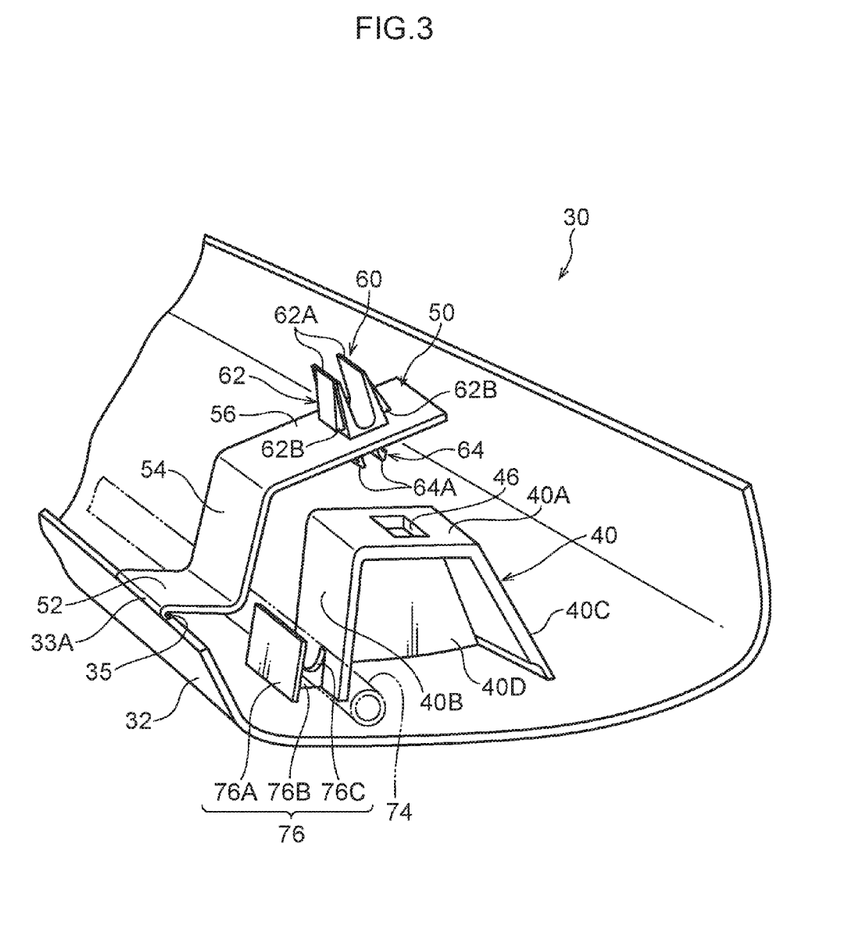
FIG. 3 is a perspective view, viewed from a back face side, showing an upper side of the pillar garnish in accordance with the first exemplary embodiment.
Figure 4:
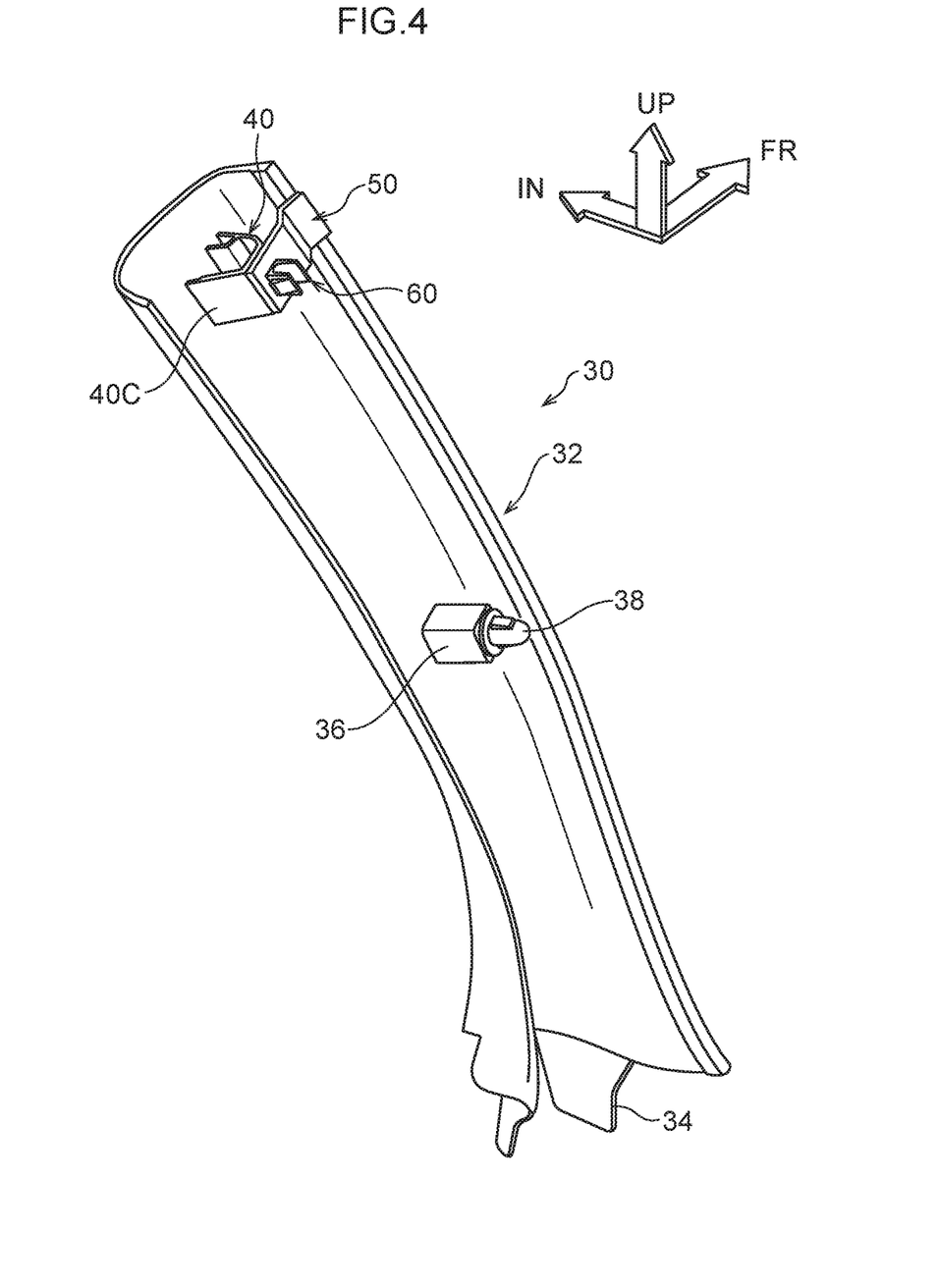
FIG. 4 is a perspective view, viewed from the back face side, showing overall structure of the pillar garnish in accordance with the first exemplary embodiment.

A front pillar garnish 30 fabricated of resin lines the vehicle width direction inner side of the pillar inner panel 14 of the front pillar 10 described above. As shown in FIG. 3 and FIG. 4, the front pillar garnish 30 is provided with a pillar garnish main body 32 (below contracted to simply "the garnish main body 32"), a plan sectional shape of which is formed substantially in a "C" shape. An insertion portion 34 that projects to the vehicle lower side in an assembled state is integrally formed at a lower end portion of the garnish main body 32. The insertion portion 34 is inserted into a vehicle width direction outer side end portion of an instrument panel, which is not shown in the drawings. An storage space 72 is formed between the garnish main body 32 and the pillar inner panel 14. The storage space 72 accommodates a curtain airbag 78, which is described below. When the curtain airbag 78 inflates and expands, the garnish main body 32 opens up in the direction of arrow A from a vehicle rear side end portion of the garnish main body 32 (below referred to as "the rear end portion 33B").

As shown in FIG. 4, a clip seat 36 is integrally formed at a back face of a length direction middle portion of the garnish main body 32. The clip seat 36 is formed in a hollow, substantially square column shape. A clip 38 fabricated of resin is attached to the clip seat 36. The clip 38 is inserted into and resiliently anchored at an attachment hole, which is not shown in the drawings, formed in the pillar inner panel 14. Thus, the length direction middle portion of the front pillar garnish 30 is fastened to the pillar inner panel 14.

A further clip seat 40 is integrally formed at the back face of an upper end portion of the garnish main body 32, at the upper side relative to the clip seat 36. The clip seat 40 is formed in a hollow, substantially square column shape. The clip seat 40 is structured by a top wall portion 40A, a front wall portion 40B, a rear wall portion 40C and a lower wall portion 40D. The top wall portion 40A is disposed to be substantially parallel with the back face of the garnish main body 32. The front wall portion 40B and rear wall portion 40C are formed as upright wall portions joining the top wall portion 40A with the back face of the garnish main body 32. The lower wall portion 40D forms a lower face of the clip seat 40. Plate thicknesses of the top wall portion 40A and the rear wall portion 40C are set to be thicker than a plate thickness of the front wall portion 40B.

The front wall portion 40B is provided upright to be substantially perpendicular with respect to the back face of the garnish main body 32, whereas the rear wall portion 40C is provided upright in a state of being inclined at a predetermined angle with respect to the back face of the garnish main body 32. The inclination direction of the rear wall portion 40C is an inclination direction such that a vehicle width direction outer side portion thereof is disposed at the vehicle front side relative to a vehicle width direction inner side portion. A rib 44 is formed integrally with the base of the front wall portion 40B. The rib 44 is formed substantially in an "L" shape in the plan sectional view. A reduced thickness portion 42 is formed at the base of the rear wall portion 40C by incision thereof at the inner side of the clip seat 40. An insertion hole 46 is formed in the top wall portion 40A.

An equipment retention portion 76 is formed at the front wall portion 40B. As shown in FIG. 3, the equipment retention portion 76 is structured by a rib plate 76A and a retention plate 76B. The rib plate 76A is disposed to be parallel with the front wall portion 40B. The retention plate 76B is disposed between the front wall portion 40B and the rib plate 76A such that a plate face thereof is substantially orthogonal to both. A recess portion 76C is formed at the retention plate 76B in a shape that runs along an outer periphery of equipment, such as a drain hose or the like, in order to retain the equipment.

A extension portion 50 is formed at substantially the same height of the garnish main body 32 as the clip seat 40. The extension portion 50 extends toward the clip seat 40, bending back from a vehicle front side end portion of the garnish main body 32 (below referred to as "the front end portion 33A") toward the side thereof at which the storage space 72 is disposed. The extension portion 50 includes a proximal end portion 52, a middle portion 54 and a joining portion 56. The proximal end portion 52 is continuous from the front end portion 33A. The middle portion 54 inflects to the vehicle width direction outer side from the proximal end portion 52. The joining portion 56 inflects and projects from the middle portion 54 so as to be substantially parallel with the top wall portion 40A of the clip seat 40. The extension portion 50 is formed integrally with the garnish main body 32. At a boundary region between the garnish main body 32 and the extension portion 50, an integral hinge 35 is formed by incision from an inner side thereof.

A distal end portion of the joining portion 56 of the extension portion 50 is disposed to be superposed with the top wall portion 40A of the clip seat 40. A clip 60 is formed at the joining portion 56, at a position that corresponds with the insertion hole 46. The clip 60 is formed integrally with the extension portion 50. The clip 60 is provided with a fastening portion 62 and an engaging portion 64.

The fastening portion 62 is provided upright so as to protrude toward the side at which the pillar inner panel 14 is disposed. The fastening portion 62 is formed substantially in a "U" shape as viewed from above, including a pair of pinch portions 62A. Pawl portions 62B are formed at outer sides of the "U" shape of the respective pinch portions 62A. The pinch portions 62A are inserted into an attachment hole 14A that is formed in the pillar inner panel 14. The attachment hole 14A is set to a size into which the pinch portions 62A can be inserted but that interferes with the pawl portions 62B. When the pair of pinch portions 62A are pushed together from the outer sides thereof and moved toward one another and are inserted into the attachment hole 14A, the pawl portions 62B resiliently deform in directions towards one another and pass through the attachment hole 14A. The pawl portions 62B are resiliently restored and are anchored at periphery portions of the attachment hole 14A. Thus, the fastening portion 62 is a structure that, once inserted, does not disengage from the attachment hole 14A.

Meanwhile, the engaging portion 64 is formed to protrude to the side at which the clip seat 40 is disposed. The engaging portion 64 is attached to the insertion hole 46 of the clip seat 40. A pair of anchoring portions 64A that are projected in the vehicle front-and-rear direction are formed at both of front-and-rear direction side portions of the engaging portion 64. These anchoring portions 64A are formed substantially in "V" shapes that protrude in the vehicle front-and-rear direction. A distance between tip portions of the pair of anchoring portions 64A is set to be longer than a front-and-rear width of the insertion hole 46 of the clip seat 40. Therefore, when the engaging portion 64 has been inserted into the insertion hole 46 of the clip seat 40, bases of the pair of anchoring portions 64A are disposed at periphery portions of the insertion hole 46 and anchored thereat. Hence, if the pair of anchoring portions 64A of the engaging portion 64 are pushed in directions such that the anchoring portions 64A move towards one another, the engaging portion 64 is compressed in the directions of pushing and resiliently deforms. Because the engaging portion 64 resiliently deforms, the distance between the tip portions of the pair of anchoring portions 64A becomes less than the front-and-rear width of the insertion hole 46, and the engaging portion 64 may be disengaged from the insertion hole 46.

The extension portion 50 is connected to the pillar inner panel 14 by the fastening portion 62 being attached to the pillar inner panel 14, and a vehicle front-and-rear direction central portion of the garnish main body 32 is connected to the pillar inner panel 14 by the engaging portion 64 being engaged with the clip seat 40. A distal end portion of the joining portion 56 of the extension portion 50 is nipped between the pillar inner panel 14 and the top wall portion 40A.

A front-and-rear direction front portion 32A of the garnish main body 32 projects diagonally forward toward the vehicle width direction outer side from a front-and-rear direction middle portion 32B of the garnish main body 32. A front-and-rear direction front side space 72A of the storage space 72 is formed between the front portion 32A and the pillar inner panel 14. Equipment 74, such as a wire harness and a drain hose or the like, is disposed in the front side space 72A. The equipment 74 is retained at the recess portion 76C of the retention plate 76B. A front-and-rear direction rear portion 32C of the garnish main body 32 projects to the vehicle width direction outer side from the front-and-rear direction middle portion 32B. A rear side space 72B of the storage space 72 is formed between the rear portion 32C and the pillar inner panel 14. The curtain airbag 78 is accommodated in the rear side space 72B in a folded state, in a long, narrow shape.

—Operation and Effects of the Present Exemplary Embodiment—

Now, operation and effects of the present exemplary embodiment are described.

When the front pillar garnish 30 is to be attached to the pillar inner panel 14, first, the extension portion 50 is connected to the clip seat 40 formed at the back face of the upper end portion of the garnish main body 32. This connection is performed by inserting the engaging portion 64 of the clip 60 into the insertion hole 46 formed in the top wall portion 40A of the clip seat 40. The distance between the pair of anchoring portions 64A formed at the engaging portion 64 is shortened by resilient deformation, the anchoring portions 64A pass through the insertion hole 46, and the distance between the tip portions of the anchoring portions 64A is made wider than the insertion hole 46 by resilient restoration. Hence, the anchoring portions 64A are anchored at the periphery portions of the insertion hole 46.

Then, the extension portion 50 is connected to the pillar inner panel 14. This connection is implemented by inserting the fastening portion 62 of the clip 60 into the attachment hole 14A formed in the pillar inner panel 14. The distance between the pair of pinch portions 62A formed at the fastening portion 62 is shortened by resilient deformation, the pinch portions 62A pass through the attachment hole 14A, and the distance between the tip portions of the pinch portions 62A is made wider than the attachment hole 14A by resilient restoration. Hence, the pinch portions 62A are anchored at the periphery portions of the attachment hole 14A.

The vehicle up-and-down direction middle portion of the garnish main body 32 and the lower end portion of the garnish main body 32 are each fixed in place, by the vehicle up-and-down direction middle portion being fastened to the pillar inner panel 14 with the separate clip 38 and the insertion portion 34 being inserted into the insertion hole that is formed at each of the two vehicle width direction end portions of the instrument panel. In the state in which the front pillar garnish 30 has been assembled to the pillar inner panel 14, the curtain airbag 78 in the folded state is accommodated in the rear side space 72B between the rear portion 32C of the garnish main body 32 and the pillar inner panel 14.

Figure 2:
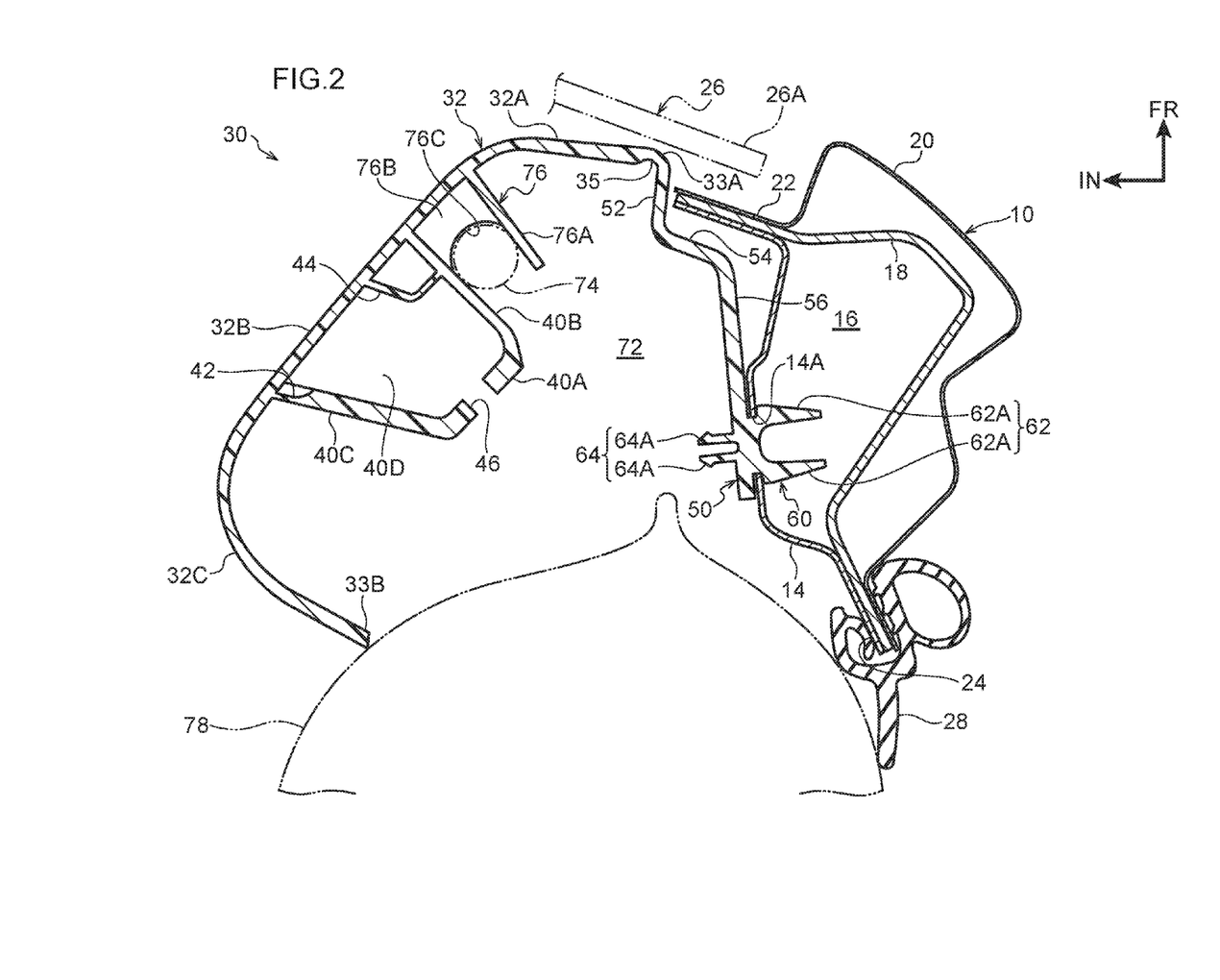
FIG. 2 is a plan sectional view showing a state when a curtain airbag has inflated and expanded from the state shown in FIG. 1.

At a time of a front collision or a time of a rollover, the curtain airbag 78 inflates and expands to a vehicle cabin inner side direction (the direction of arrow A in FIG. 1). At this time, the clip seat 40 of the garnish main body 32 is pulled out in the vehicle cabin inner side direction (the direction of arrow A in FIG. 1) and the engaging portion 64 of the clip 60 is disengaged from the insertion hole 46. The rear end portion 33B of the garnish main body 32 moves away from the door opening weatherstrip 28 and the storage space 72 opens up as illustrated in FIG. 2.

When the curtain airbag 78 is inflating and expanding, the front pillar garnish 30 according to the present exemplary embodiment turns to the vehicle cabin inner side thereof about the integral hinge 35. Thus, the opening for expansion of the curtain airbag 78 may be made large. Moreover, because the integral hinge 35 is formed at the center of rotation, the front pillar garnish 30 may be turned more smoothly.

After the expansion of the curtain airbag 78, the front pillar garnish 30 is connected with the pillar inner panel 14 by the extension portion 50. Therefore, detachment of the front pillar garnish 30 toward the vehicle inner side may be prevented.

In the present embodiment, an example is described in which the extension portion 50 is nipped between the top wall portion 40A of the clip seat 40 and the pillar inner panel 14. However, the extension portion 50 does not necessarily have to be nipped between the top wall portion 40A and the pillar inner panel 14. For example, the engaging portion 64 may be formed as a separate member from the fastening portion 62 of the clip 60, with the extension portion 50 being connected to the pillar inner panel 14 by the fastening portion 62, and the top wall portion 40A of the clip seat 40 being engaged with the pillar inner panel 14 using the engaging portion 64 at an alternative location (for example, at the vehicle front-and-rear direction rear side relative to the fastening portion 62). The extension portion 50 may be stably supported by being nipped between the top wall portion 40A of the clip seat 40 and the pillar inner panel 14 as in the present embodiment. Because the extension portion 50 is fixed to the pillar inner panel 14 together with the clip seat 40 by the fastening portion 62, the structure may be simplified and the number of components may be reduced compared to a case in which fixing of the extension portion 50 and fixing of the clip seat 40 are respectively separately specified.

In the present exemplary embodiment, the extension portion 50 and clip 60 are formed integrally, but the extension portion 50 and clip 60 may be separate bodies. When the extension portion 50 and clip 60 are formed integrally as in the present exemplary embodiment, the number of components is not increased and fabrication costs may be kept down.

Figure 5:
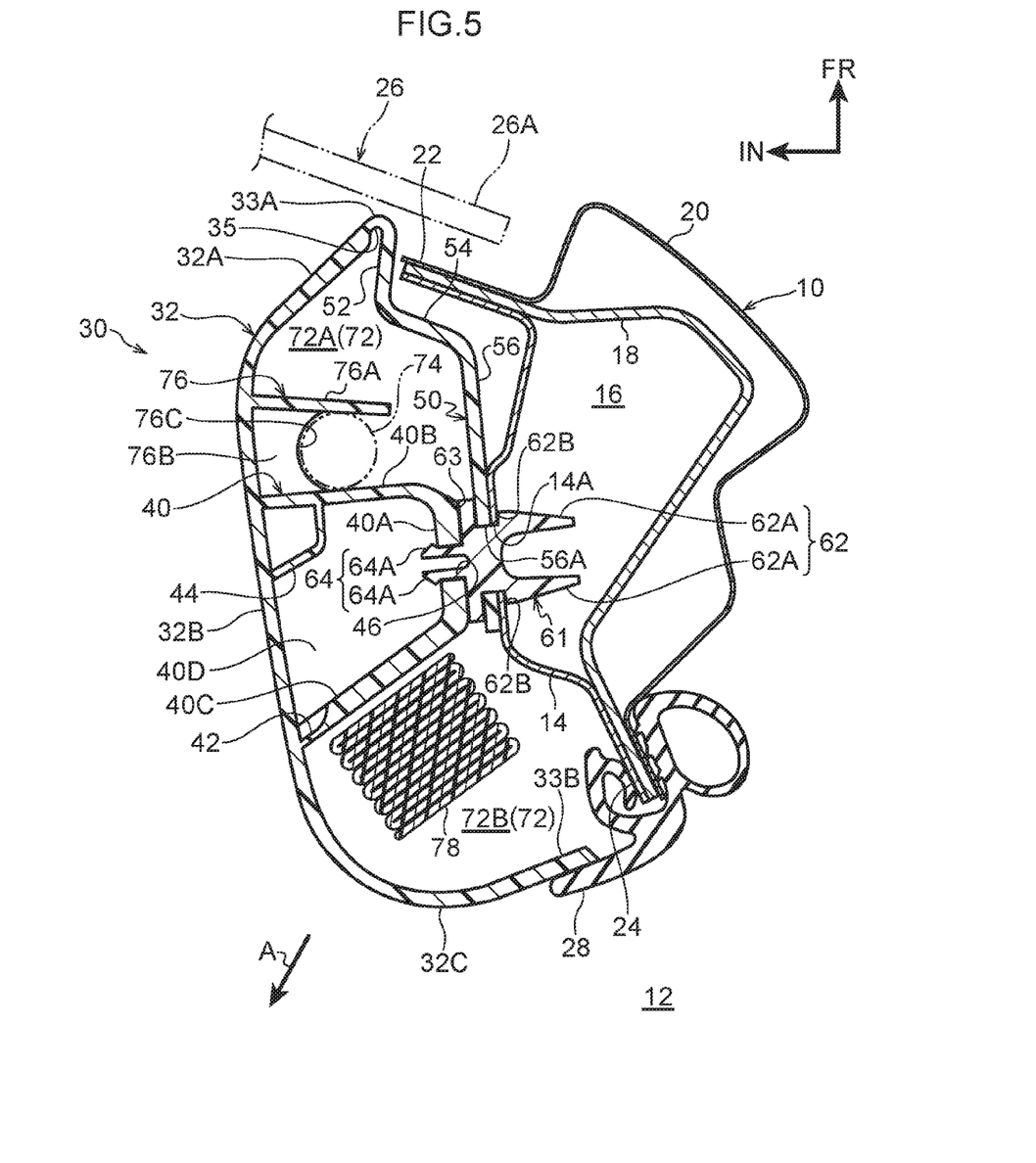
FIG. 5 is a plan sectional view of an assembled state of a pillar garnish in accordance with a variant example of the first exemplary embodiment.

If the extension portion 50 and clip 60 are separate bodies, then, as illustrated in FIG. 5, a separate clip 61 at which the fastening portion 62 and engaging portion 64 are formed integrally is used. A penetrating hole 56A for attachment of the separate clip 61 is formed in the joining portion 56 of the extension portion 50. The separate clip 61 includes a flange portion 63 between the fastening portion 62 and the engaging portion 64. The attachment of the front pillar garnish 30 to the pillar inner panel 14 is implemented by the engaging portion 64 of the separate clip 61 being inserted into the insertion hole 46 of the clip seat 40 and the fastening portion 62 being inserted into the penetrating hole 56A of the extension portion 50 and the attachment hole 14A of the pillar inner panel 14.

In the present exemplary embodiment, the integral hinge 35 is formed at the front end portion 33A of the garnish main body 32. However, the integral hinge 35 is not necessarily required. Moreover, the location at which the integral hinge 35 is formed may be a location that is offset from the front end portion 33A toward the side at which the clip seat 40 of the garnish main body 32 is disposed.

In the present exemplary embodiment, the equipment retention portion 76 is formed at the clip seat 40, but the equipment retention portion 76 is not necessarily required. The equipment 74 may be retained and looseness of the equipment may be suppressed by the equipment retention portion 76 being formed as in the present exemplary embodiment. Further, because separate members for retaining equipment are not required, the number of components is not increased and fabrication costs may be kept down.

—Second Exemplary Embodiment—

Now, a second exemplary embodiment of the pillar garnish according to the present invention is described. In the present exemplary embodiment, portions that are the same as in the first exemplary embodiment are assigned the same reference symbols and detailed descriptions thereof are not given.

Figure 6:
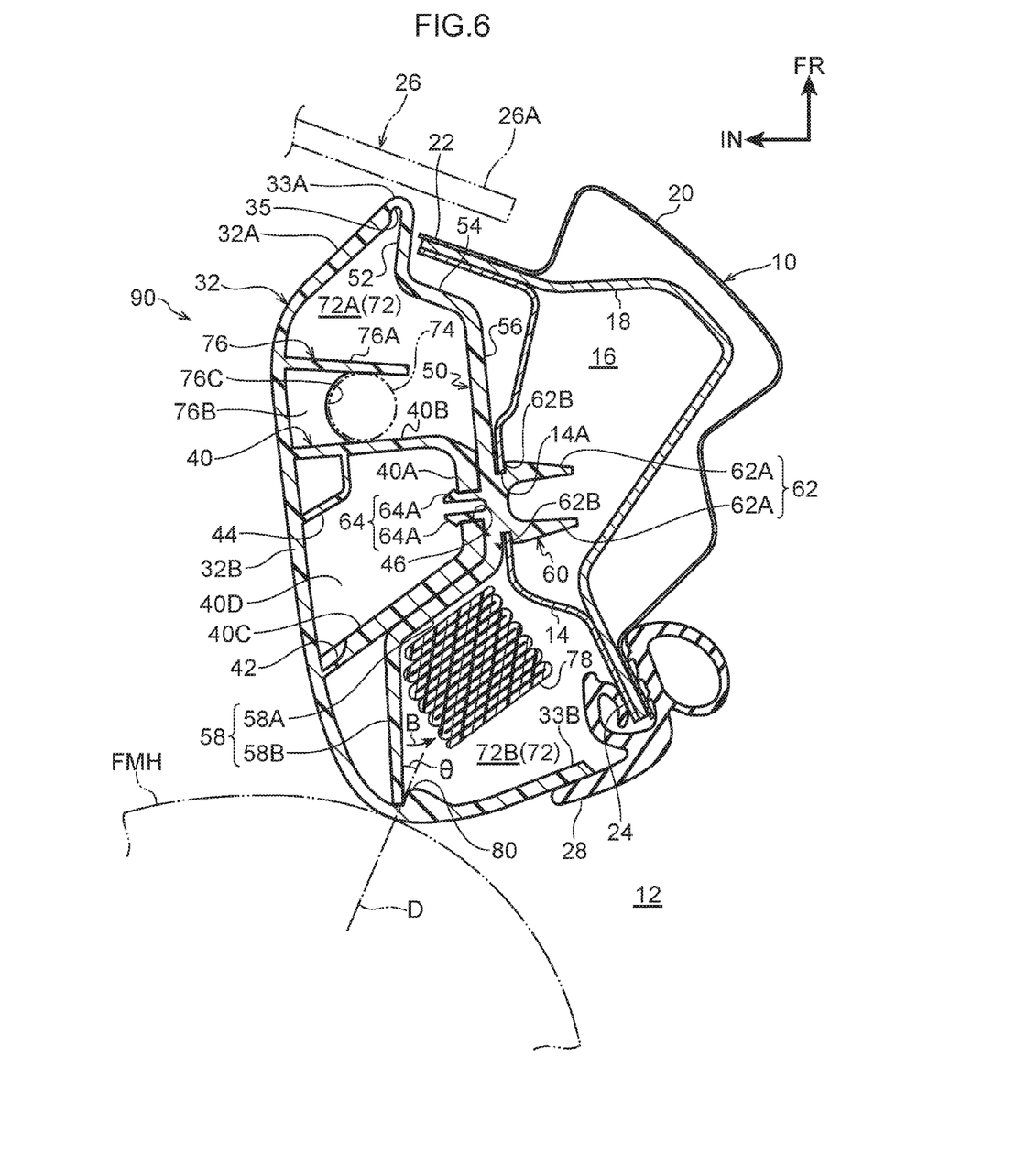
FIG. 6 is a plan sectional view of an assembled state of a pillar garnish in accordance with a second exemplary embodiment.

As illustrated in FIG. 6, a retention portion 80 is formed at a front pillar garnish 90 according to the present exemplary embodiment. The retention portion 80 is formed at the back side of the garnish main body 32, at the vehicle rear side relative to the clip seat 40. A location of formation of the retention portion 80 is specified to be in a vicinity of the clip seat 40. The retention portion 80 is formed in a shape protruding to the back side of the garnish main body 32.

At the distal end side of the extension portion 50, the extension portion 50 is projected further to form a shock-absorbing portion 58. The shock-absorbing portion 58 includes a base portion 58A and a distal end portion 58B. The base portion 58A projects along the rear wall portion 40C from the top wall portion 40A of the clip seat 40. The distal end portion 58B is inflected toward the retention portion 80 from a middle portion of the rear wall portion 40C. The distal end portion 58B is disposed close to the vehicle width direction inner side of the retention portion 80 and is retained by the retention portion 80. A direction of arrangement of the distal end portion 58B is at an angle θ with respect to a load input direction D. For example, the direction of arrangement of the distal end portion 58B is at the angle θ with respect to an impact direction D of a free motion headform (FMH, meaning the head of a dummy) in head impact testing.

If the FMH collides with the front pillar garnish 90, the distal end portion 58B of the shock-absorbing portion 58 buckles to the side thereof at which the curtain airbag 78 is disposed (i.e., in the direction of arrow B), absorbing the impact from the FMH.

According to the front pillar garnish 90 in accordance with the present exemplary embodiment, during expansion of the curtain airbag 78, the same effects as in the first exemplary embodiment may be provided. In addition, impact absorption performance for an FMH in head impact protection testing may be improved. Moreover, the curtain airbag 78 expands along the distal end portion 58B. Thus, the shock-absorbing portion 58 acts as a guide and the curtain airbag 78 may be expanded more consistently.

In the present exemplary embodiment, an example is described in which the direction of arrangement of the distal end portion 58B is at the angle θ with respect to the FMH impact direction D. However, if the distal end portion 58B is of a thickness that deforms relatively easily, the angle θ is not necessarily required; the distal end portion 58B may absorb the impact of an FMH by flexingly deforming in response to the impact.

The variations described for the first exemplary embodiment (the separate clip 61 and suchlike) may be applied to the present exemplary embodiment too.

In the first and second exemplary embodiments described above, the present invention is applied to the front pillar garnish 30 or 90 but this is not limiting. The present invention may also be applied to a rear pillar garnish.

The invention claimed is:

1. A pillar garnish comprising:
   a pillar garnish main body that forms, between the pillar garnish main body and a body panel, a storage space configured to store a curtain airbag in a folded state;
   an extension portion that is bent back and extends toward the storage space from a first end portion of the pillar garnish main body that is at an opposite side of the pillar garnish main body from a second end portion of the pillar garnish main body that is at a curtain airbag expansion side of the pillar garnish main body;
   an integral hinge formed at a back side of the first end portion of the pillar garnish main body, the garnish main body turning about the integral hinge in a case that the curtain airbag expands;
   a fastening portion integrally formed with the extension portion, the fastening portion fastening the extension portion to the body panel;
   an attachment portion that is provided at a back side of the pillar garnish main body; and
   an engaging portion integrally formed with the extension portion, the engaging portion engaging the attachment portion and attaching the attachment portion to the body panel, the engaging portion disengaging the attachment portion in the case that the curtain airbag expands.

2. The pillar garnish according to claim 1, wherein the extension portion is fixed together with the attachment portion to the body panel by the fastening portion, in a state in which the extension portion is nipped between the attachment portion and the body panel.

3. The pillar garnish according to claim 1, wherein an equipment retention portion, for equipment that is disposed in the storage space, is formed at the attachment portion.

4. The pillar garnish according to claim 1, further comprising:
   a retention portion that is formed at a location that corresponds with the second end portion of the pillar garnish main body; and
   a shock-absorbing portion that projects from the extension portion toward a side thereof at which the retention portion is disposed, a distal end portion of the shock-absorbing portion being retained at the retention portion.

* * * * *